C. PEARSON.
MOWING MACHINE.
APPLICATION FILED JAN. 27, 1913.

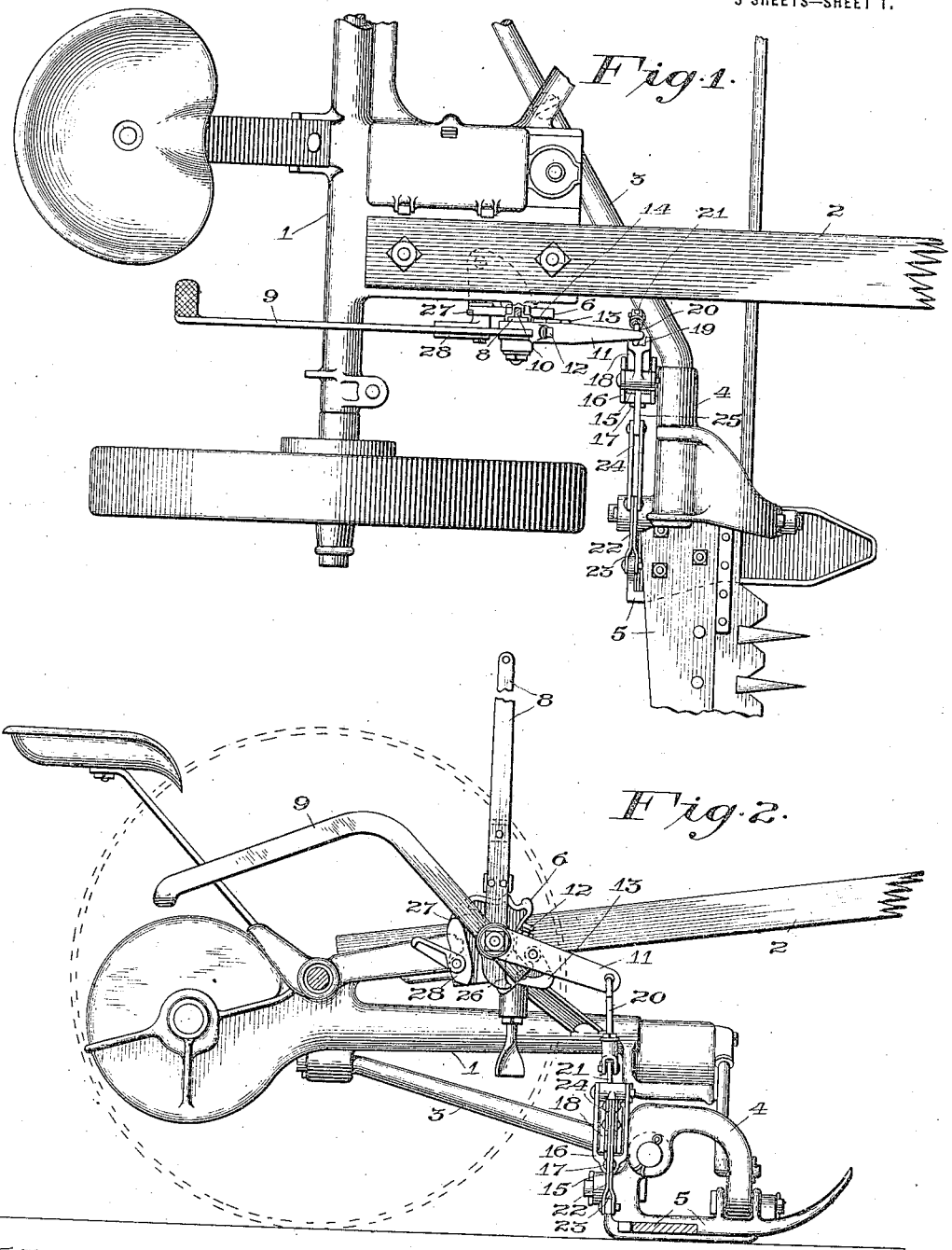

1,240,361.

Patented Sept. 18, 1917.
3 SHEETS—SHEET 2.

Witnesses:
F. W. Hoffmeister
C. C. Palmer.

Inventor.
Charles Pearson
By Chas. E. Lord
Attorney.

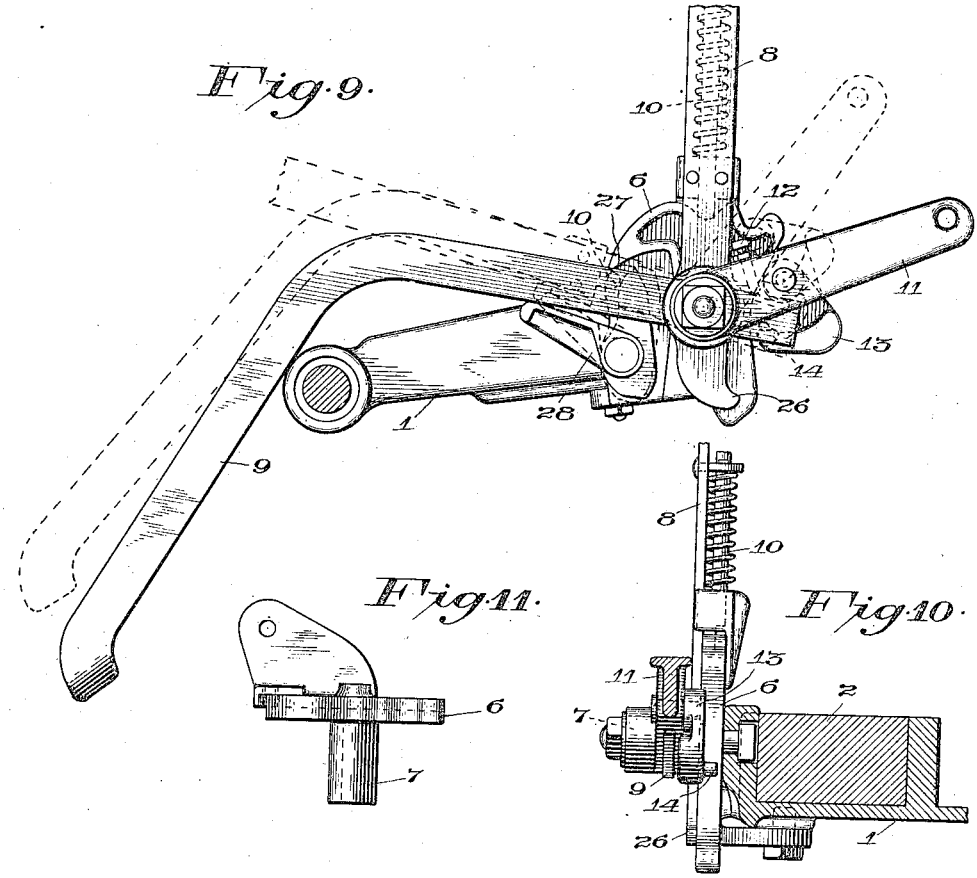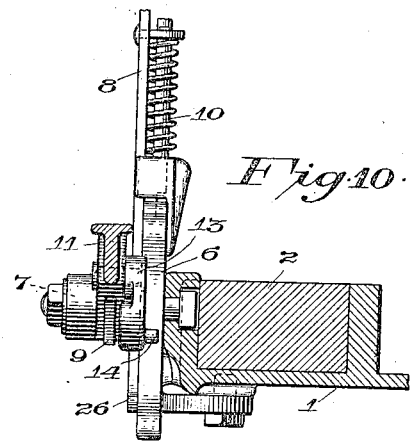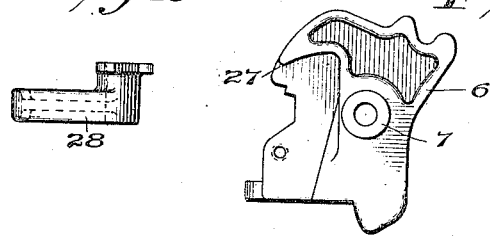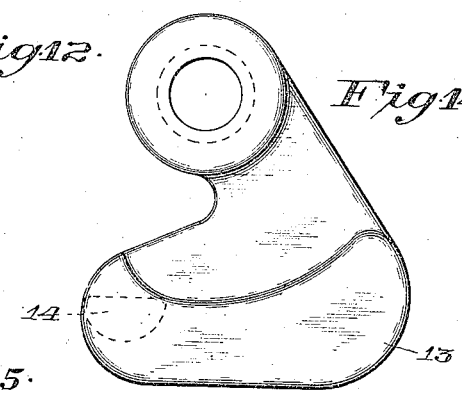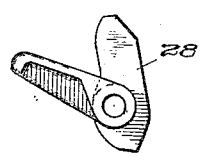

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,240,361.  Specification of Letters Patent.  Patented Sept. 18, 1917.

Application filed January 27, 1913. Serial No. 744,537.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a specification.

My invention relates to mowing machines. It has among its objects to provide improved means whereby the finger bar may be raised from a horizontal to an absolute vertical position, or lowered from its vertical to its horizontal position as desired, the coupling frame of the mower being raised and lowered therewith and being so controlled by the raising and lowering means, and without the necessity of separate holding means therefor, that premature lowering of the coupling frame prior to the time that the bar reaches an operative angle with respect to the ground, is effectually prevented. A further object of my invention is to provide improved operative connections between the adjusting lever and the finger bar and improved means for locking and unlocking the adjusting lever. I attain these objects by an improved construction of finger bar adjusting mechanism and improved controlling mechanism, all combined and coöperating as hereinafter more fully set forth.

In the accompanying drawings I have, for purposes of illustration, shown one embodiment which my invention may assume in practice.

In these drawings:

Figure 1 represents a top plan view of part of a mowing machine having my invention forming a part thereof;

Fig. 2 is a side elevation of Fig. 1;

Fig. 9 is a detached part of Fig. 1 on an enlarged scale and designed to illustrate the operation of the hand and foot lever mechanism;

Fig. 10 represents a front elevation, partly in section, of part of Fig. 9;

Fig. 11 is a top plan view of a toothed sector forming part of the finger bar lifting mechanism;

Fig. 12 is a side elevation of the toothed sector as shown in Fig. 11 and designed to coöperate with the lifting lever mechanism;

Fig. 13 is a top plan view of a detent tripping arm forming part of the finger bar controlling mechanism;

Fig. 14 is a side elevation on an enlarged scale of part of the hand lever mechanism; and Fig. 15 is a side elevation of Fig. 13.

The same reference numerals designate like parts throughout the several views.

Figure 3:
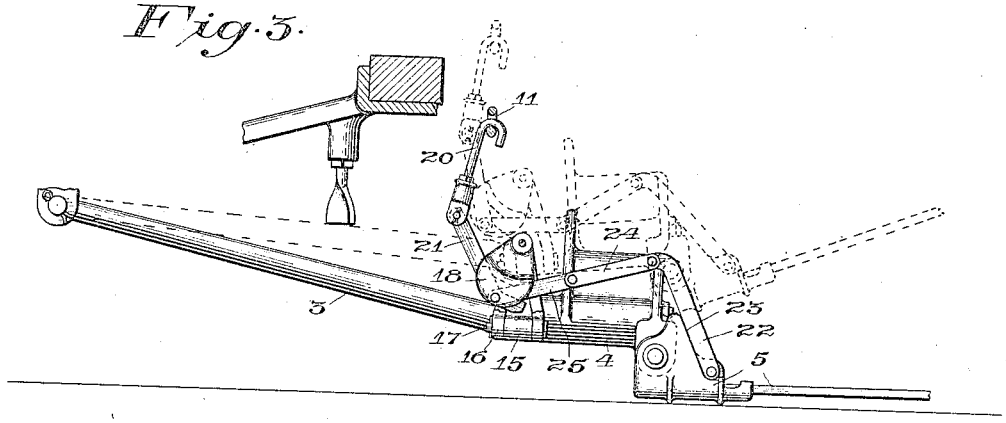
Fig. 3 is a detached part of Fig. 1 and designed to illustrate the construction and operation of a part of the lifting lever mechanism.
Figure 4:
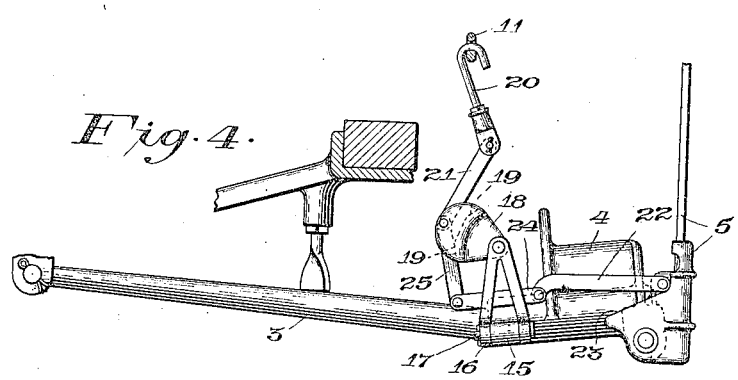
Fig. 4 is a similar view showing the finger bar in a vertical position.
Figure 5:
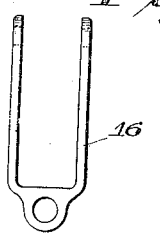
Fig. 5 represents a detail part of the link connection between the lifting lever and the finger bar.
Figure 6:
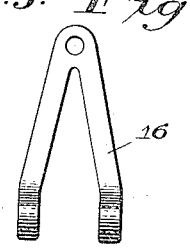
Fig. 6 is a side elevation of Fig. 5.
Figure 7:
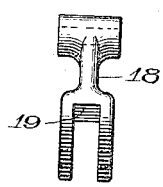
Fig. 7 is a vertical elevation of a swinging fulcrum forming part of the finger bar controlling mechanism.
Figure 8:
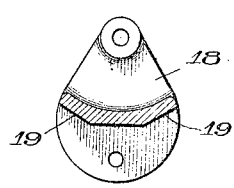
Fig. 8 is a sectional side elevation of Fig. 7.

1 represents the main frame of a mowing machine, 2 a draft tongue secured thereto, 3 a coupling bar having a coupling yoke 4 journaled upon the grainward end thereof, and 5 a shoe and finger bar pivotally connected with the yoke in a manner permitting the grainward end thereof to swing to a vertical position. 6 represents a toothed sector secured to the main frame of the machine and provided with a laterally projecting stem 7 upon which is pivotally mounted a hand lever 8 and a foot lever 9, the hand lever being provided with a spring-pressed sliding detent 10 adapted to engage with the toothed sector 6. 11 represents an arm having one end thereof pivotally mounted upon the stem 7 and provided with a slotted portion adapted to receive the front end of the foot lever 9, and 12 represents an adjusting screw carried by said arm and adapted to engage with the front end of the foot lever that extends in front of the axis thereof. 13 represents a freely swinging block pivotally mounted upon the arm 11 and provided with a laterally projecting lip portion 14 that normally engages with the lower end of the toothed sector. 15 represents an ear member integral with the yoke 4, and 16 a swinging link, preferably of the bifurcated type, having the lower end thereof connected with said ear member by means of a pivot pin 17 arranged at right angles with the line of draft of the machine. 18 represents a fulcrum or gagging member pivotally connected with the opposite end of link 16 and movable between the arms thereof provided with oppositely disposed angular bearing surfaces 19. 20 represents a link adjustable as to its length and having the upper end thereof connected with the arm 11 and its opposite end with one end of a link 21, the opposite end of link 21 being pivotally connected with the fulcrum member 18, and extending beyond its pivotal connection therewith in such a manner as to engage with one of the angular bearing surfaces 19 when the finger bar is raised to a vertical position, as shown in Fig. 4, the body of the link being adapted to engage with the opposite bearing surface when the finger bar is in a horizontal position, as shown in Fig. 3. 22 represents a link having one end thereof pivotally connected with the finger bar shoe, the shoe being provided with a shoulder portion 23 that engages with the body of the link during a part of its operation. The opposite end of the link 22 is pivotally connected with one end of a link 24, and the opposite end of link 24 is pivotally connected with one end of a gagging link 25, the opposite end of which is pivotally connected with the fulcrum or gagging member 18 coaxially with the link 21. When the finger bar is in a horizontal position the links 21 and 25 are in engagement with the angular bearing surfaces 19 of the fulcrum member 18 and remain in engagement therewith until the finger bar is raised to a vertical position, the arrangement of the associated parts of the link mechanism being such as to produce a differential leverage during the operative action thereof in swinging the finger bar to a vertical position.

To swing the finger bar to a vertical position the operator first presses downward upon the foot lever 9, thereby rocking the arm 11 about the axis thereof to the position shown in dotted lines in Fig. 9. The hand lever is then drawn rearward and the toe portion 26 thereof engages with the rear curved end of the swinging block 13 and thereby rocks the arm 11 independent of the foot lever to the full line position shown in Fig. 4. When the finger bar is in a vertical position the detent 10 engages with one of the rear notches 27 of the toothed sector in a manner to secure the lever in its adjusted position. To release the detent there is provided a swinging bell crank lever 28 pivotally mounted upon the toothed sector member and having one arm adapted to engage with the detent and another arm engaging with the foot lever whereby an initial downward movement of the foot lever rocks the member 28 against the end of the detent in a manner to cause a disengagement thereof from the toothed sector and permit the hand lever to swing forward. It is thus seen that in raising the bar to vertical position the operator, by first depressing the foot lever 9, raises the bar into the dotted line position shown in Fig. 3, and then by movement of the hand lever 8, lifts the bar to the vertical position shown in Fig. 4, the detent mechanism 10 automatically locking the bar in that position. When it is desired to lower the bar this detent mechanism is released by depressing the foot lever 9 from the dotted line position shown in Fig. 9 to the full line position shown therein, the bell crank 28 being operated by this movement to throw out the latch of the detent, as hereinabove described. The construction shown is also adapted to use as a plain lift mower, in which case the operator uses either the foot lever 9 as above described or the hand lever 8. When the hand lever is used for this purpose, its toe portion 26 kicks the swinging block 13 out of its path and engages with the collar thereof rather than with the curved rear end of the latter, and thereby lifts the arm 11 until the finger bar is in the position shown in dotted lines in Fig. 3, in which position, obviously, the detent mechanism will also act to lock the lever and bar.

In the operation of my improved construction the finger bar may be raised to an absolute vertical position, as shown in Fig. 4, and lowered therefrom upon movement of the operating lever 8. When in its vertical position it is to be noted that the weight of the coupling frame and bar is supported on the pivot of the member 18 on the member 16, the toe on the link 21 then acting to hold the parts in the position shown in Fig. 4, irrespective of the weight of the finger bar, the holding force acting in a line drawn beween the pivot of the member 18 mentioned and the pivot of the link 20 on the arm 11. Obviously, also, by my improved construction, with the parts in this position, the finger bar will be held against rocking by the engagement of the link 25 with the gagging member 18. As the hand lever 8 is turned about its pivot to lower the bar, however, the link connections 19 and 21 are flexed. During the first stages of the movement, the finger bar, due to its connection to the member 8 and its pivot on the stubbleward side of its connection to the link 22, is given an outward impetus so that its links may unfold and the bar may assume an operative angle with respect to the ground. This, it will be noted, occurs prior to any material lowering of the coupling frame, the lowering of the latter being retarded and the member 18 being held up by its operative connections during the lowering movement of the bar, as shown in dotted lines in Fig. 3, until the bar reaches the well known operative angle with respect to the ground.

It is to be noted that in this construction the initial movement of the bar in raising the latter to vertical position is brought about by the use of the foot lever and that the bar is carried from the dotted line position, shown in Fig. 3, to the vertical or full line position, shown in Fig. 4, by movement of the hand lever, the latter automatically coöperating with the swinging block in imparting a further upward movement to the bar through the improved link connections between the end of the arm 11 and the bar. It is further to be noted that after the detent is released as the bar is lowered from its up or vertical position, the operator is able, if desired, to control the downward movement of the same through the foot lever and the hand lever, the foot lever through its connection with the pin 12 tending to prevent a too rapid movement of the bar during the last stages of its movement, while the hand lever, through its toe portion 26 and its coöperation with the block 13, has a similar function throughout the movement of the bar. Attention is further directed to the fact that with the mechanism shown it is unnecessary for the operator, in raising or lowering the bar, to manipulate any detent mechanism, the detent mechanism being automatic in its operation and the operator being only required to exert a pull on the lever.

While I have in this application described one form which my invention may assume in practice, it is, of course, to be understood that the form shown herein is chosen for purposes of illustration and that the invention may be embodied in other forms without departing from its spirit.

What I claim as being my invention, and desire to secure by Letters Patent, is:

1. In a mowing machine, a machine frame, a coupling frame, a finger bar, an operating member, and means including a single flexible connection between said operating member, said coupling frame and said finger bar whereby upon movement of said operating member said coupling frame may be raised and said bar moved independently thereof to absolute vertical position and back to an operative angle with respect to the ground prior to the lowering of said coupling frame.

2. In combination, a frame, a coupling frame thereon, a finger bar pivoted to said coupling frame, an operating member on said frame, and means including a single flexible connection between said operating member, said coupling frame and a point at the grassward side of said finger bar pivot whereby, upon movement of said member in one direction, said coupling frame may be raised and said bar moved independently thereof to absolute vertical position and upon a reverse movement of said member automatically turned downwardly about its pivot.

3. In a mowing machine, a frame, an operating lever thereon, a coupling frame operatively connected to said frame, a finger bar pivotally connected to said coupling frame, a gagging member pivoted on said coupling frame, and link connections pivotally connected between said lever and said gagging member and said gagging member and said finger bar whereby upon movement of said lever the bar may be raised to an absolute vertical position and lowered therefrom.

4. In a mowing machine, a machine frame, a movable operating member thereon, a coupling frame connected to said machine frame, a finger bar connected to said coupling frame, and means including operative connections between said elements whereby upon movement of said operating member in one direction said coupling frame and bar may be raised and said bar may be subsequently raised independently to an absolute vertical position and upon a reverse movement of said operating member said bar may be lowered to an operative angle relative to the ground prior to the lowering of said coupling frame.

5. In a mowing machine, a machine frame, an operating lever thereon, a coupling frame operatively connected to said machine frame, a finger bar pivotally connected to said coupling frame, a gagging member pivotally mounted on said coupling frame, a coöperating gagging link pivotally connected to said gagging member and extending therefrom toward said bar, a plurality of pivotally connected links flexibly connecting said gagging link to said finger bar, and operative connections between said operating lever and said gagging member whereby the latter may be swung about its pivot.

6. In a mowing machine, a machine frame, an operating lever thereon, a coupling frame pivoted to said machine frame, a finger bar pivoted to said coupling frame, a gagging member pivoted on said coupling frame, a coöperating gagging link pivoted to said gagging member and extending therefrom toward said bar, a plurality of coöperating pivotally connected links of unequal length pivoted to said gagging link and said finger bar and normally having their pivotal connections disposed at one side of a line between their pivots to said gagging link and finger bar, and operative connections between said operating lever and said gagging member.

7. In a mowing machine, a machine frame, a coupling frame operatively connected thereto, a finger bar pivotally connected to said coupling frame, a gagging member pivotally connected to said coupling frame, an operating lever pivoted on said machine frame, link connections pivoted to said gagging member and finger bar and connecting said elements, and means between said lever and gagging member operative when the former is moved about its pivot for raising the pivot of said link connections to said gagging member above the pivot of the latter and bringing in substantial alinement all of the pivots of a plurality of the links in said link connections.

8. In a mowing machine, a machine frame, an operating lever thereon, a coupling frame operatively connected to said machine frame, a finger bar pivotally connected to said coupling frame, a gagging member pivotally connected to said coupling frame, a coöperating gagging link pivoted to said gagging member and extending therefrom toward said bar, a plurality of coöperating pivotally connected links pivoted to said gagging link and said finger bar, and means controlled by said lever for depressing said gagging member and the pivotal connection of said coöperating links.

9. In a mowing machine, a machine frame, a coupling frame pivoted thereon, a finger bar pivoted to said coupling frame, an operating lever pivoted to said machine frame, an upstanding member pivoted to said coupling frame and movable thereon in a fore and aft direction, a transversely disposed gagging member pivoted on said member and movable in a plane at right angles to the axis thereof, and flexible connections between said gagging member and said operating lever and between said gagging member and said finger bar.

10. In a mowing machine, a machine frame, a rising and falling coupling frame thereon, a finger bar pivoted on said coupling frame, a bifurcated member pivoted to said coupling frame and movable thereon in a fore and aft direction, a transversely disposed gagging member pivoted to said member and swinging beneath its pivot between the arms thereof, a flexible connection between one end of said gagging member and said operating lever, and a flexible connection between the opposite end of said gagging member and said finger bar.

11. In a mowing machine, a frame, a coupling frame pivotally connected thereto, a finger bar pivotally connected to said coupling frame, a lifting lever carried on said frame, operative connections between said lever and bar, detent mechanism on said lever and engageable with said frame for locking said lever in a predetermined position, a second lifting lever coöperating with said first mentioned lever, and means for automatically releasing said detent mechanism on operation of said coöperating lever.

12. In a mowing machine, a frame, a coupling frame pivotally connected thereto, a finger bar pivotally connected to said coupling frame, a lifting lever carried on said frame, operative connections between said lever and bar, a notched sector carried on said frame, detent mechanism on said lever automatically engageable with said sector as said lever is moved, and foot operated mechanism mounted on said first mentioned frame for releasing said detent mechanism from said sector.

13. In a mowing machine, a frame, a coupling frame pivotally connected thereto, a finger bar pivotally connected to said coupling frame, a lifting lever carried on said frame, operative connections between said lever and bar, a notched sector on said frame, automatically acting detent mechanism on said lever engageable with said sector, a second lifting lever coöperating with said first mentioned lever, and means for automatically releasing said detent mechanism from said sector on operation of said coöperating lever.

14. In a mowing machine, a frame, a coupling frame pivotally mounted thereon, a finger bar pivotally mounted on said coupling frame, a lifting lever pivotally mounted on said frame, operative connections between said lifting lever and bar, a second lifting lever pivoted on said frame, detent mechanism for automatically locking said lever in a predetermined position, and a detent releasing bell crank carried on said frame and actuated by said last mentioned lifting lever.

15. In a mower, a frame, a coupling frame pivotally connected thereto, a finger bar pivotally mounted on said coupling frame, a lifting lever pivotally mounted on said frame, an arm pivotally mounted on said frame and operatively connected to said lifting lever, operative connections between said arm and bar, a swinging block pivotally mounted on said arm and movable therewith when the latter is raised by said lifting lever, and a supplemental lifting lever pivoted on said frame and engaging the lower end of said swinging block after a predetermined movement of said first mentioned lever.

16. In a mowing machine, a frame, a coupling frame pivotally mounted thereon, a finger bar pivotally mounted on said coupling frame, an arm pivotally mounted on said frame, operative connections between one end of said arm and said finger bar, a swinging block pivotally mounted on said arm having a depending curved portion, a foot lever pivoted on said frame and operatively connected to said arm, and a hand lever pivoted on said frame and operable after a predetermined movement of said foot lever having means engageable with the curved portion of said block.

17. In a mowing machine, a frame, a coupling frame pivotally mounted thereon, a finger bar pivotally mounted on said coupling frame, a lifting lever pivotally mounted on said frame, an arm pivotally mounted on said frame, operative connections between said arm and said finger bar, a block pivoted on said arm having a hub portion and a depending swinging body portion, means movable with said lifting lever engageable with the hub of said block or with the depending body portion thereof, and coöperating lifting mechanism for raising the body portion of said block into position to be thus engaged.

18. In a mowing machine, a frame, a coupling frame pivotally mounted thereon, a finger bar pivotally mounted on said coupling frame, an arm pivotally mounted on said frame, operative connections between one end of said arm and said finger bar, a swinging block pivotally mounted on said arm having a depending curved portion, a foot lever pivoted on said frame and operatively connected to said arm, a hand lever pivoted on said frame and operable after a predetermined movement of said foot lever having means engageable with the curved portion of said block, detent mechanism for automatically locking said hand lever in a predetermined position of adjustment, and means controlled by said foot lever for releasing said detent mechanism.

19. In a mowing machine, a frame, a coupling frame pivotally mounted thereon, a finger bar pivotally mounted on said coupling frame, an arm pivotally mounted on said frame, operative connections between one end of said arm and said finger bar, a swinging block pivotally mounted on said arm having a depending curved portion, a foot lever pivoted on said frame and operatively connected to said arm, a hand lever pivoted on said frame and operable after a predetermined movement of said foot lever having means engageable with the curved portion of said block, detent mechanism for automatically locking said hand lever in a predetermined position of adjustment, and a bell crank pivoted to said frame having one arm engageable with said foot lever and the other engageable with the latch of said detent mechanism.

20. A mowing machine including, in combination, a main frame, a rising and falling coupling frame, a finger bar pivotally connected with said coupling frame in a manner permitting it to be raised to a vertical position, means for raising and lowering said finger bar, said means including an arm pivotally connected with said main frame, and a link mechanism connecting said arm with said finger bar, a foot lever pivoted upon said frame coaxially with said arm and having a toe portion, and an adjusting screw carried by said arm and engageable with said toe portion.

21. A mowing machine including, in combination, a main frame, a rising and falling coupling frame, a finger bar pivotally connected with said coupling frame in a manner permitting it to be raised to a vertical position, means for raising and lowering said finger bar, said means including an arm pivotally connected with said main frame, and a link mechanism connecting said arm with said finger bar, a swinging block carried by said arm, a hand lever pivotally connected with said main frame and having a toe member engageable with said swinging block.

22. A mowing machine including, in combination, a main frame, a rising and falling coupling frame, a finger bar pivotally connected with said coupling frame in a manner permitting it to be raised to a vertical position, means for raising and lowering said finger bar, said means including a toothed sector carried by said main frame, a hand lever pivotally mounted upon said sector, a spring-pressed sliding detent carried by said lever and adapted to engage with said toothed sector, and a swinging bell crank lever carried by said sector and engageable with said detent when said lever has reached the limit of its rearward movement, and means for operating said bell crank lever.

23. A mowing machine including, in combination, a main frame, a rising and falling coupling frame, a finger bar pivotally connected with said coupling frame in a manner permitting it to be raised to a vertical position, means for raising and lowering said finger bar, said means including a toothed sector carried by said main frame, an arm pivotally mounted upon said sector, and a link mechanism connecting said arm with said finger bar, a hand lever pivotally mounted upon said sector and provided with a sliding detent adapted to engage with said toothed sector, said hand lever adapted to engage with said arm, a foot lever pivotally mounted upon said sector and having a toe member adapted to engage with said arm, a swinging bell crank lever carried by said sector, having one arm thereof engageable with said detent when said hand lever has reached the limit of its rearward movement, and the remaining arm of said bell crank lever engageable with said foot lever.

24. A mowing machine including, in combination, a main frame, a rising and falling coupling frame, a coupling yoke carried by said coupling frame, a finger bar pivotally connected with said yoke in a manner permitting it to rise to a vertical position, means for raising and lowering said finger bar, said means including a hand and foot lever mechanism carried by said main frame, a link mechanism connecting said lever mechanism with said finger bar, said link mechanism including a swinging link pivotally mounted upon said coupling yoke, a fulcrum member pivotally connected with said link, link members upon opposite sides of said fulcrum member and having the adjacent ends thereof pivotally connected therewith, the opposite ends of said link members being connected with said hand lever mechanism and said finger bar, respectively.

25. A mowing machine including, in combination, a main frame, a rising and falling coupling frame, a coupling yoke carried by said coupling frame, a finger bar pivotally connected with said yoke in a manner permitting it to rise to a vertical position, means for raising and lowering said finger bar, said means including a hand and foot lever mechanism carried by said main frame, a link mechanism connecting said lever mechanism with said finger bar, said link mechanism including a swinging link pivotally mounted upon said coupling yoke, a fulcrum member pivotally connected with said link, and provided with oppositely disposed angular surfaces, link members arranged upon opposite sides of said fulcrum member and having the adjacent ends thereof pivotally connected therewith, the opposite ends of said link members being connected with said hand lever mechanism and said finger bar, respectively, and said link members engaging with said angular surfaces during a part of their operative movement.

26. In a mowing machine, a main frame, a coupling frame, a finger bar, and means for elevating said coupling frame and for raising said finger bar into a vertical position, said means including operating mechanism and connections between the finger bar, the coupling frame and said operating mechanism, whereby the coupling frame is held in raised position independently of the connections connected to said finger bar when the latter is in a vertical position.

27. In a mowing machine, a main frame, a coupling frame, a finger bar, means for lifting said coupling frame and for raising said finger bar into a vertical position including operating mechanism, and connections between said operating mechanism and coupling frame and said coupling frame and finger bar whereby the coupling frame is held in raised position independently of the connections between the coupling frame and finger bar when the latter is in a vertical position and while said bar is being unfolded.

28. In a mowing machine, a frame, a coupling frame pivotally connected thereto, a shoe pivotally mounted on said coupling frame, a finger bar carried on said shoe, a lifting lever pivotally mounted on said frame, a link pivotally mounted on said shoe at a point below and on the grassward side of the pivot of said shoe and extending upwardly and stubblewardly from its pivot, a gagging member pivotally mounted on said coupling frame, link connections intermediate said gagging member and the upper end of said pivoted link, and link connections intermediate said gagging member and said lifting lever.

29. In a mowing machine, a frame, a coupling frame pivotally connected thereto, a shoe pivoted on said coupling frame having an upstanding shoulder, a finger bar carried by said shoe, an upstanding link pivotally connected to said shoe at one side of the pivot thereof and engageable with said shoulder at a point intermediate the ends of the link when the cutter bar is in operative position, a swinging gagging member pivoted on said coupling frame, a link connection intermediate said gagging member and the upper end of said link, a lifting lever pivotally mounted on said frame, and operative connections between said lifting lever and said link connections.

30. In a mowing machine, a frame, a coupling frame pivotally connected thereto, a shoe pivoted on said coupling frame, a finger bar carried by said shoe, an upwardly and stubblewardly extending link pivoted to said shoe on the grassward side of the shoe pivot, a plurality of pivoted links connected to the upper end of said link and having their pivots normally in alinement, a lifting lever pivotally mounted on said frame, and operative connections between said lifting lever and said link mechanism for depressing the stubbleward link of said plurality of links and forming a toggle connection when the bar is in vertical position.

CHARLES PEARSON.

Witnesses:
 RAY PATTISON,
 FRANK A. ZABILKA.

Copies of this patent may be obtained for five cents each, by addressing the "Commissioner of Patents, Washington, D. C."